United States Patent Office 3,275,639
Patented Sept. 27, 1966

3,275,639
O-ALKYL-NITROSIMMONIUM SALTS AND PROCESS FOR THEIR PRODUCTION
Siegfried Huenig, Hochberg, near Wurzburg, Lothar Geldern, Hamburg-Harburg, and Eberhard Luecke, Ludwigshafen (Rhine), Germany, assignors to Badische Anilin- & Soda-Fabrik Aktiengesellschaft, Ludwigshafen (Rhine), Germany
No Drawing. Filed June 28, 1963, Ser. No. 291,284
Claims priority, application Germany, July 5, 1962, B 67,924
16 Claims. (Cl. 260—293)

This invention relates to compounds of the general formula

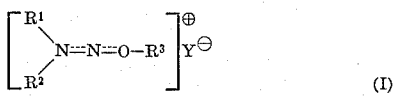

(I)

and to a process for their production. In said formula $R^1$ denotes aliphatic, cycloaliphatic, araliphatic and aromatic radicals, $R^2$ denotes aliphatic, cycloaliphatic and araliphatic radicals, $R^3$ denotes low-molecular alkyl radicals and $Y^\ominus$ denotes radicals of strong mineral acids. $R^1$ and $R^2$ may also be connected to each other and form five- or six-membered rings together with the nitrogen atom.

The compounds according to Formula I fall in a new category of compounds and are termed O-alkyl-nitrosimmonium salts.

The object of our invention is a new type of reactive compounds for use in organic syntheses.

Another object is compounds which are capable of liberating nitrogen on adding bases and which can therefore be used, for example, for expanding plastics.

Another object is a method for making such compounds.

Compounds according to Formula I are obtained by interacting nitrosamines of the general formula

(II)

in which $R^1$ and $R^2$ have the meaning given above, with strong alkylating agents functioning to introduce the radicals $R_3$ and the anion $Y^\ominus$ into the molecule.

Examples of $R^1$ and $R^2$ are aliphatic groups, such as branched and linear alkyl groups, in particular low-molecular alkyl groups having up to 12 C atoms, and alkyl groups substituted, inter alia, by halogen atoms or low-molecular alkoxy groups;

Cycloaliphatic groups, such as the cyclohexyl or cyclopentyl group and the derivatives thereof substituted by low-molecular alkyl groups or halogen and Araliphatic groups, such as the benzyl and beta-phenylethyl groups and their derivatives substituted in their nucleus by low-molecular alkyl or alkoxy groups, halogen or nitro groups.

$R^1$ may be aromatic groups, such as the phenyl and naphthyl groups, and their derivatives substituted by low molecular alkyl or alkoxy groups, nitro groups or halogen.

$R^1$ and $R^2$, as stated above, may be interconnected and form a five- or six-membered ring with the nitrogen atom, for example a pyrrolidine, piperidine or morpholine ring.

The starting materials of Formula II used are therefore N-nitroso-compounds derived from secondary amines, as for example dimethylnitrosamine ($R^1$ and $R^2$=methyl), diethylnitrosamine ($R^1$ and $R^2$=ethyl), dibutylnitrosamine ($R^1$ and $R^2$=butyl), dodecylmethylnitrosamine ($R^1$=dodecyl; $R^2$=methyl), di-beta-chloroethylnitrosamine ($R^1$ and $R^2$=betachloroethyl), dichlorohexylnitrosamine ($R^1$ and $R^2$=cyclohexyl), cyclohexylethylnitrosamine ($R^1$=cyclohexyl; $R^2$=ethyl), dibenzylnitrosamine ($R^1$ and $R^2$=benzyl), benzylmethylnitrosamine ($R^1$=benzyl; $R^2$=methyl), phenylmethylnitrosamine ($R^1$=phenyl; $R^2$=methyl), N-nitrospyrrolidine ($R^1$ and $R^2$=tetramethylene), N-nitrosopiperidine ($R^1+R^2$=pentamethylene) and N-nitrosomorpholine ($R^1+R^2$=3-oxopentamethylene). Further nitrosamines for use in the practice of our invention are given and their production described in J. Am. Chem. Soc., 83 (1961), p. 4417.

Examples of $R^3$ are branched and linear low-molecular alkyl radicals, such as the methyl, isobutyl or dodecyl group and examples of $Y^\ominus$ are iodide, and especially perchlorate and fluoborate.

The alkylation is carried out with strong alkylating agent, as alkyliodides used in the presence of silver fluoborate or silver perchlorate, and, to special advantage, trialkyloxonium salts, such as trimethyloxonium fluoborate, triethyloxonium perchlorate, and the alkenealkyl-oxonium salts derived from cyclo ether, such as dimethylene-, trimethylene-, tetramethylene- and pentamethylenealkoxonium fluoborate or perchlorate.

Using the alkylating agent in slight excess is advantageous but not necessary.

Beneficially, the nitrosamines are alkylated in polar solvents which cannot themselves be alkylated, as for example halogenated hydrocarbons. Especially good yields are achieved when anhydrous solvents are used. Although the reaction is practically independent of temperature, temperatures of from 0° to 40° C. are preferred.

The products according to Formula I dissolve in polar solvents, such as methanol, partly also in water, substantially without decomposition, and in many cases are obtained in pure state by crystallization, as for example from methanol at low temperature, while solvents having no hydroxyl groups, such as methylethylketone and ether and mixtures there of are preferred.

The O-alkylnitrosimmonium salts according to our invention are valuable intermediates for organic syntheses. Moreover their capacity to liberate nitrogen on adding bases makes them useful for quite a number of applications. Suitable bases are, for example, aqueous alkali hydroxide solutions and organic amines, such as piperidine, triethylamine, cyclohexylamine and n-butylamine. Reaction between the O-alkylnitrosimmonium salts and said bases occurs even in the cold. These salts are the first useful substances that liberate nitrogen in the basic range. As a result, they are applicable to special advantage for expanding synthetic resins in the alkaline hardening of, for example, epoxy resins. As the liberation of nitrogen is a measure of the quantity of the base, the compounds according to this invention afford an elegant method for the volumetric determination of the content of the base in mixtures of chemical substances.

The following examples serve to illustrate the nature of our invention and how the same is carried out in practice, the parts and percentages given being by weight. Parts by weight bear the same relation to parts by volume as the kilogram does to the liter (S.T.P.).

*Example 1*

74 parts of dimethylnitrosamine is added at room temperature to a solution of 240 parts of triethyloxonium fluoborate and 100 parts by volume of anhydrous ethylene chloride. After the solution has become slightly warm and two layers have formed, the lower layer is stripped, washed with ether and concentrated at room temperature, O-ethyl - N,N - dimethylnitrosimmonium fluoborate crystallizing out as colorless crystals. The hygroscopic crystals, after having been washed with isopropanol and ether, are obtained in a yield of more than 90% of the theory. They have a melting point of 40° to 41.2° C. and a BF₄ content of 45.8; 45.5% (calc. 45.7%).

*Example 2*

By treating a solution of 240 parts of triethyloxonium fluoborate in 100 parts by volume of ethylene chloride to which 100 parts of N-nitrosopyrrolidine have been added, in the manner described in Example 1, O-ethyl-N,N-tetramethylenenitrosimmonium fluoborate is obtained in a yield of more than 90% of the theory. It has a melting point of 67.5 to 68.5° C. and a BF₄ content of 40.8 and 40.6% (calc. 40.2%).

*Example 3*

By treating a solution of 240 parts of triethyloxonium fluoborate in 100 parts by volume of ethylene chloride to which 114 parts of N-nitrosopiperidine have been added, in the manner described in Example 1, O-ethyl-N,N-pentamethylenenitrosimmonium fluoborate is obtained in a yield of more than 90% of the theory. It has a melting point of 50.5 to 51° C. The analysis gave: Found: C, 36.65%; H, 6.47%; N, 12.51%; BF₄, 13.13%. Calculated: C, 36.55%; H, 6.57%; N, 12.18%; BF₄, 37.47%.

*Example 4*

A solution of 114 parts of N-nitrosopiperidine, 142 parts of methyl iodide and 1500 parts by volume of anhydrous nitromethane is combined with a solution of 207 parts of silver perchlorate and 1200 parts by volume of anhydrous nitromethane and the mixture is allowed to react for 2 hours away from light and moisture. The liquid is then filtered from the precipitated silver iodide by suction and the filtrate is concentrated in an evaporator. The residue is a colorless oily substance which crystallizes by adding ether at 0° C. The crystallized substance is separated off and dried in vacuo with silica gel, O-methyl-N,N-pentamethylenenitrosimmonium perchlorate being obtained in a yield of 92% of the theory. Recrystallized from ethanol it has a melting point of 60.5 to 61.5° C.; its chlorine content is 15.6 and 15.75% (calc. 15.5%).

*Example 5*

A solution of 226 parts of N-nitrosdibenzylamine in 150 parts by volume of anhydrous ethylene chloride is combined at a temperature of about 20° C. with a solution of 190 parts of triethyloxonium fluoborate in 80 parts by volume of ethylene chloride. The faintly yellow mixture thus obtained is heated to 35° to 40° C. for 30 minutes. After cooling ether is fed in in such an amount that a second phase is formed. This phase is separated and stripped of solvent at 15° C. in vacuo, O-ethyl-N,N-dibenzylnitrosimmonium fluoborate being obtained as a pale yellow oil in a yield of 98%.

*Example 6*

136 parts of N-nitrosomethylaniline are run into a solution of 19 parts of triethyloxonium fluoborate in 30 parts by volume of anhydrous ethylene chloride at room temperature. The reaction mixture warms up after about 10 minutes assuming a brown coloration and separates to form two phases. After allowing the reaction mixture to stand for an hour the green bottom phase is stripped and freed of any solvent left at 25° C. in vacuo. The O-ethyl-N-methyl-N-phenylnitrosimmonium fluoborate obtained as a green oil crystallizes on being cooled to 0° C. The crystal cake is disintegrated in ether and then freed of ether away from moisture. The yield amounts to 93% of the theory.

In the infrared spectrum the compound shows an absorption band at 1588 cm.⁻¹ which is characteristic of this class of compounds. Its behavior toward bases is identical with that of the compounds obtained in the previous examples, i.e., it decomposes with liberation of nitrogen.

We claim:
1. An O-alkylnitrosimmonium salt of the formula

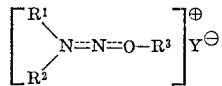

wherein:
R¹ when taken alone represents a radical selected from the group consisting of alkyl of 1 to 12 carbon atoms, cycloalkyl of 5 to 6 carbon atoms, benzyl, phenylethyl, phenyl, naphthyl, and said benzyl, phenylethyl, phenyl and naphthyl substituted by a member selected from the group consisting of lower alkyl, halogen, lower alkoxy and nitro;
R² when taken alone represents a radical selected from the group consisting of alkyl of 1 to 12 carbon atoms, said alkyl substituted by halogen, said alkyl substituted by lower alkoxy and cycloalkyl of 5 to 6 carbon atoms;
R¹ and R² when taken together with the nitrogen atom represent a saturated heterocyclus of 5 to 6 ring members;
R³ represents alkyl of 1 to 12 carbon atoms; and
Y⊖ is the anion of a strong mineral acid.

2. A compound of the formula

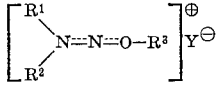

wherein:
R¹, R² and R³ each represent lower alkyl; and
Y⊖ represents the perchlorate anion.

3. A compound of the formula

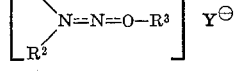

wherein:
R¹, R² and R³ each represent lower alkyl; and
Y⊖ represents the fluoborate anion.

4. A compound of the formula

wherein:
R³ represents lower alkyl;
n represents an integer of 4 to 5; and
Y⊖ represents the perchlorate anion.

5. A compound of the formula

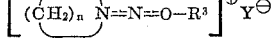

wherein:
R³ represents lower alkyl;
n represents an integer of 4 to 5; and
Y⊖ represents the fluoborate anion.

6. The compound of the formula

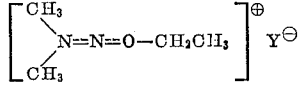

wherein Y⊖ is the anion of a strong mineral acid.

7. The compound of the formula

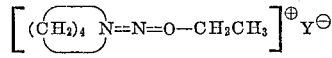

wherein Y⊖ is the anion of a strong mineral acid.

8. The compound of the formula

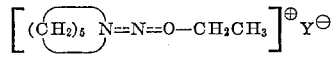

wherein Y⊖ is the anion of a strong mineral acid.

9. The compound of the formula

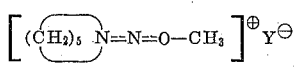

wherein $Y^{\ominus}$ is the anion of a strong mineral acid.

10. The compound of the formula

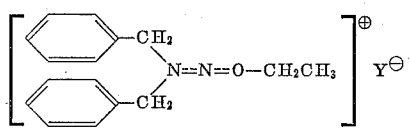

wherein $Y^{\ominus}$ is the anion of a strong mineral acid.

11. The compound of the formula

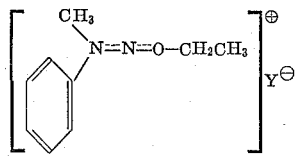

wherein $Y^{\ominus}$ is the anion of a strong mineral acid.

12. A process for the production of O-alkylnitrosimmonium salts of the formula

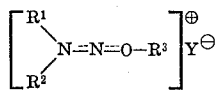

wherein:
- $R^1$ when taken alone represents a radical selected from the group consisting of alkyl, haloalkyl and alkoxyalkyl of 1 to 12 carbon atoms, cycloalkyl and substituted cycloalkyl of 5 to 6 carbon atoms wherein the substituents of cycloalkyl are selected from the groups consisting of halogen and lower alkyl, benzyl, phenylethyl, phenyl, naphthyl, and said benzyl, phenylethyl, phenyl and naphthyl substituted by a member selected from the group consisting of lower alkyl, halogen, lower alkoxy and nitro;
- $R^2$ when taken alone represents a radical selected from the group consisting of alkyl, haloalkyl and alkoxyalkyl of 1 to 12 carbon atoms, and cycloalkyl and substituted cycloalkyl of 5 to 6 carbon atoms wherein the substituents of cycloalkyl are selected from the group consisting of halogen and lower alkyl;
- $R^1$ and $R^2$ when taken together with the nitrogen atom represent a saturated heterocyclus of 5 to 6 ring members;
- $R^3$ represents alkyl of 1 to 12 carbon atoms; and
- $Y^{\ominus}$ is the anion of a strong mineral acid;

which process comprises reacting a nitrosamine of the formula

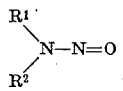

wherein $R^1$ and $R^2$ have the same meaning as hereinbefore defined with a strong alkylating agent.

13. A process as claimed in claim 12 wherein said alkylating agent is a compound selected from the class consisting of trialkyl- and alkylenealkyl-oxonium salts.

14. A process as claimed in claim 12 wherein said reaction is carried out in a solvent consisting essentially of a halogenated hydrocarbon.

15. A process as claimed in claim 14 wherein said solvent is anhydrous.

16. A process as claimed in claim 12 wherein said reaction is carried out at a temperature of about 0° C. to 40° C.

References Cited by the Examiner

UNITED STATES PATENTS 3,153,094  10/1964  Reily _____ 260—313

OTHER REFERENCES

Hünig et al., Angew. Chem., 75 (11), 476 (June 7, 1963).

WALTER A. MODANCE, *Primary Examiner.*

A. D. SPEVACK, *Assistant Examiner.*